(12) United States Patent
Morley et al.

(10) Patent No.: US 10,461,991 B1
(45) Date of Patent: Oct. 29, 2019

(54) DYNAMIC REPLICATION PEERING

(71) Applicant: Amazon Technologies, Inc., Seattle, WA (US)

(72) Inventors: Adam Douglas Morley, Seattle, WA (US); Timothy Andrew Rath, Des Moines, WA (US); Swaminathan Sivasubramanian, Sammamish, WA (US)

(73) Assignee: Amazon Technologies, Inc., Seattle, WA (US)

( * ) Notice: Subject to any disclaimer, the term of this patent is extended or adjusted under 35 U.S.C. 154(b) by 240 days.

(21) Appl. No.: 15/269,156

(22) Filed: Sep. 19, 2016

(51) Int. Cl.
*H04L 12/24* (2006.01)
*H04L 29/08* (2006.01)

(52) U.S. Cl.
CPC ...... *H04L 41/0668* (2013.01); *H04L 41/0681* (2013.01); *H04L 67/104* (2013.01); *H04L 67/1095* (2013.01)

(58) Field of Classification Search
CPC ............ H04L 41/0668; H04L 41/0681; H04L 67/104; H04L 67/1095; H04L 67/1097; H04L 67/16; H04L 2209/38; H04L 2209/56; H04L 41/08; H04L 41/0816; H04L 9/3297; H04L 12/462; H04L 41/0659; H04L 45/00; H04L 45/50; H04L 67/1076; H04L 69/40; H04L 9/3213; H04L 9/3236; H04L 9/3239; H04L 9/3247; G06F 16/27; G06F 11/1425; G06F 11/2094; G06F 16/273; G06F 11/2097; G06F 3/0617; G06F 3/0659; G06F 11/1662; G06F 11/2028; G06F 11/2041; G06F 11/2048; G06F 2201/825; G06F 3/0653; G06F 3/0683; G06F 16/25; G06F 16/278; G06F 11/1451; G06F 3/065; G06F 3/067; G06F 11/1482; G06F 16/10; G06F 16/1844; G06F 16/2343; G06F 16/2358; G06F 16/2379; G06F 11/182; G06F 11/187; G06F 11/2025; G06F 16/176; G06F 16/1787; G06F 16/182; G06F 16/184; G06F 16/1865; G06F 2201/82; G06F 2209/522; G06F 3/0604; G06F 3/0679; G06F 3/0688; G06F 9/526; G06F 11/14; G06F 11/2035; G06F 11/2043; G06F 16/2365; G06F 16/275; G06F 21/602;
(Continued)

(56) References Cited

U.S. PATENT DOCUMENTS 7,933,987 B2 * 4/2011 Aidun ................. G06F 11/2025
                                                         709/203
8,661,130 B2 * 2/2014 Sonoda ................ G06F 9/5061
                                                         709/200

(Continued)

*Primary Examiner* — Glenford J Madamba
*Assistant Examiner* — Abderrahmen Chouat
(74) *Attorney, Agent, or Firm* — Davis Wright Tremaine LLP

(57) ABSTRACT

A distributed database system may comprise a master computing node and one or more replication peer nodes. Upon identifying a failure of one of the nodes, a control plane may obtain a computing node instance and configure the computing node instance to act as a log-only peer to the remaining nodes. The log-only peer may store the log tail of the master computing node and may participate in quorum decisions. Upon restoration of the failed node, the log-only peer may be returned to the pool of computing node instances.

20 Claims, 11 Drawing Sheets

(58) Field of Classification Search
CPC . G06F 21/64; G06F 2201/815; G06Q 20/401;
G06Q 20/02; G06Q 20/065; G06Q
20/0655; G06Q 20/389; G06Q 20/405;
G06Q 20/42; G06Q 40/12; H04W 84/20;
H05K 999/99; Y10S 707/99952
See application file for complete search history.

(56) References Cited

U.S. PATENT DOCUMENTS

| | | | | |
|---|---|---|---|---|
| 2010/0082728 | A1* | 4/2010 | Cooper | G06F 11/2097 709/202 |
| 2012/0166390 | A1* | 6/2012 | Merriman | G06F 17/30578 707/613 |
| 2012/0254655 | A1* | 10/2012 | Butterworth | G06F 11/1658 714/4.11 |
| 2013/0111261 | A1* | 5/2013 | Dalton | G06F 17/30581 714/4.11 |
| 2016/0224432 | A1* | 8/2016 | Junqueira | G06F 11/1464 |

* cited by examiner

DYNAMIC REPLICATION PEERING

BACKGROUND

Recently, distributed database systems have been employed to maintain collections of data. Multiple computing nodes, potentially distributed across various geographic regions and data centers, may collectively provide applications with a reliable mechanism for storing and retrieving data.

Distributed database systems sometimes employ a process commonly described as replication. Typically, one of the computing nodes in the distributed database is designated as a master, and maintains what might be described as a primary version of a collection of data. Other nodes in the system may be designated as replication peers. These nodes may maintain copies of the primary version of the collection based on data transmitted from the master. The operation of the replicas may, among other potential benefits, reduce the chance that data will be lost in the event that the master computing node fails. However, data may be at risk when an insufficient number of replication peers are employed.

BRIEF DESCRIPTION OF DRAWINGS

The following detailed description may be better understood when read in conjunction with the appended drawings. For the purposes of illustration, various examples of aspects of the disclosure are shown in the drawings; however, the invention is not limited to the specific methods and instrumentalities disclosed.

DETAILED DESCRIPTION

Figure 1A:
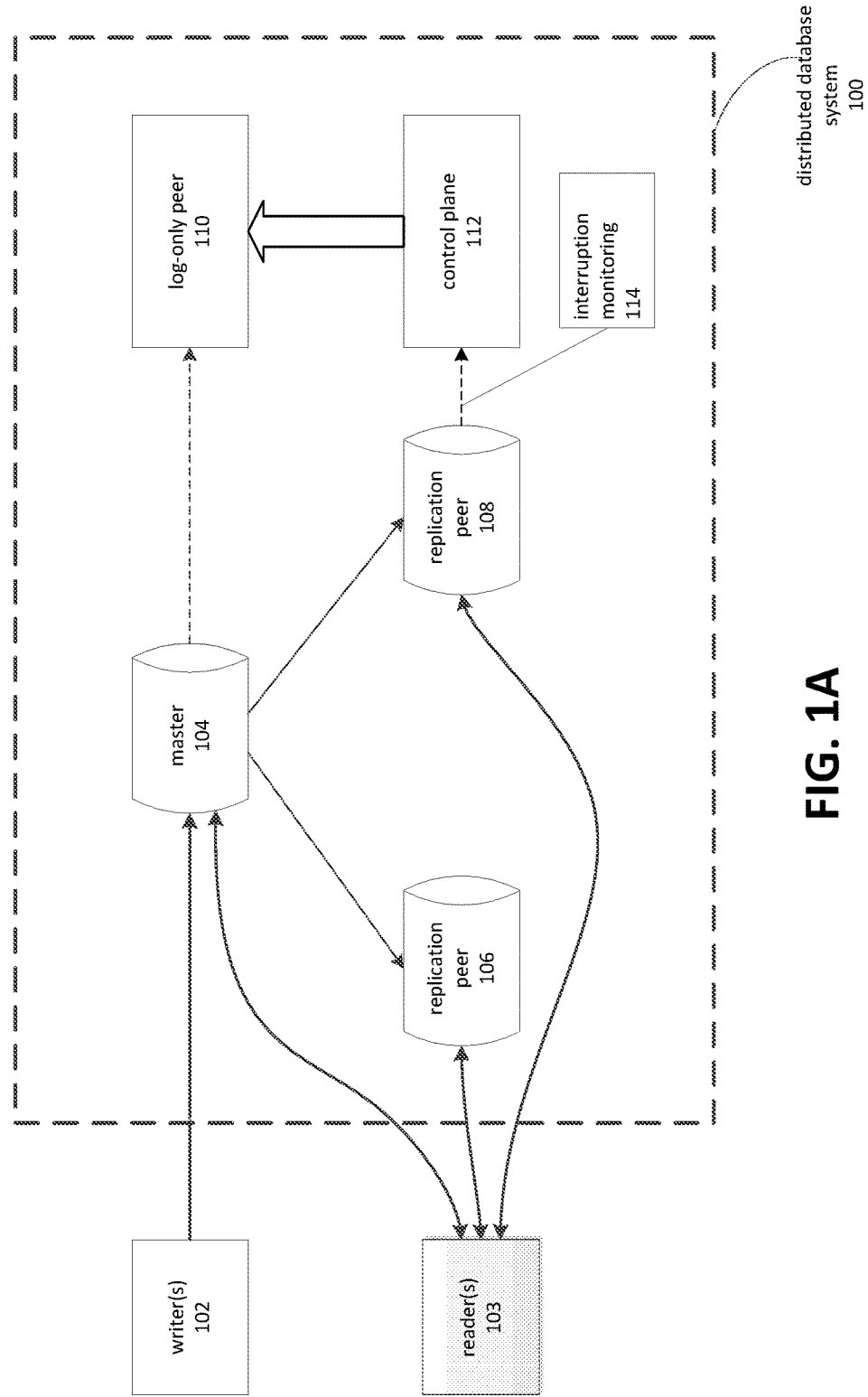
FIG. 1A is a block diagram depicting a distributed database system.

Disclosed herein are systems, methods, and computer program products pertaining to replication in distributed databases. Example embodiments may comprise a distributed database system comprising a master computing node, at least one replication peer, and a control plane. The control plane may identify an interruption in the replication process associated with a failure of a replication peer, or some other event which causes the replication peer to at least temporarily suspend its participation in the replication process. In response, the control plan may obtain and/or initialize an additional computing node instance that may serve as a log-only peer in the replication process. The log-only peer may comprise computing resources that are relatively lightweight compared to those of a full-featured replication peer. In particular, the log-only peer may comprise resources sufficient to perform its primary mission of receiving and storing transaction log information while the replication peer's participation in the replication process remains interrupted.

In an example, a system may comprise a first computing node configured as a master in a replication relationship at least a second computing node which acts as a replication peer. The master may receive information indicative of a first plurality of transactions. The first plurality of transactions may correspond to transactions that have been received by the master but which have not yet been committed to the collection of data.

A second computing node may be a replication peer associated with the master. The second computing node may receive information describing the transactions being applied to the master's version of the collection of data, and apply corresponding changes to a replica of the collection. Thus, the first computing node typically maintains a primary version of the collection of data on a first storage device, and the second computing node maintains a replica of the collection on a second storage device.

A control plane may receive information indicating that the second computing node's participation in the replication process has been interrupted. In response, the control plane may cause a third computing node to be obtained for use in the distributed database system. This may comprise identifying processor and storage requirements of a log-only process that is to operate on the third computing node, obtaining a compatible computing node instances, configuring the computing node instance to execute a log-only process, and so on. The control plane may, in some instances, obtain a suitable computing node instance from a pool of such instances. The control plane may then configure the computing node instance to act as a log-only peer in the replication process.

The control plane may reconfigure the master to incorporate the log-only peer into the replication process. The master may then send, to the log-only peer, information describing transactions that have been received by the master but which have not yet been fully committed, for example by having achieved quorum or having been applied to at least two versions of the collection of data, e.g. the primary version and at least one replace. These uncommitted transactions may be described as the "tail" of the master's transaction log. The master may also transmit transaction information for transactions received subsequently.

The control plane, stated generally, may cause the master computing node and log-only peer to perform various operations. The control plane may cause the operations to be performed by configuration operations performed on the respective computing nodes. For example, the control plane may modify the configuration of a master computing node so that it treats a log-only peer as a partner in the replication process. The control plane may obtain a computing node instance and configure it as a log-only peer, so that it is caused to receive transaction data from the master computing node and record the transaction data in a log file. In some instances, the control plane may cause the master and log-only peer, or other components of a distributed database, to perform operations by sending data signals over a network. For example, the control plane may send a signal to the master to instruct it to send transaction log tail data to the log-only peer. In another example, the control plane may send a signal to a computing node instance which causes the instance to perform certain operations, such as reboot, execute a program, and so forth.

The third computing node, for the period in which the replication peer is out-of-service, receives the transaction information and records it in a log. The log-only peer may also participate in quorum decisions. The third computing node may participate in quorum decisions by, for example, verifying that information describing a transaction has been durably recorded in a log file. In some instances, the storage device of the third computing node may be configured to have capacity sufficient for storing transaction information for a predicted number of transactions. The predicted number may be based on a predicted outage period and a predicted volume of transactions.

A control plane may comprise a computing device and associate software instructions for performing functions such as monitoring the operational status of computing nodes in a distributed system, obtaining, deploying, and/or configuring additional computing node instances, configuring network topology, reconfiguring operational computing nodes, and so forth.

FIG. 1A is a block diagram depicting a distributed database system 100. The distributed database may comprise a number of computing node instances 104, 106, 108. The number of computing node instances 104-108 may vary between embodiments. Typically, the number of computing node instances 104-108 may be selected to ensure that an adequate number of nodes are available to participate in quorum decisions and to ensure that a minimum number of data copies are available at any given time. It may be a goal of the system design to ensure that certain more severe system failure modes are never more than N "ordinary" failures away, where N signifies a desired level of risk tolerance. One of the computing node instances may be designated as a master 104 in a replication process. The other two nodes may be designated as replication peers 106, 108.

The master 104 may maintain a collection of data on a storage device. A writer 102 may correspond to a client device or other source of requests to insert, update, and/or delete data from the collection of data maintained by the master 104. Such requests may be described as transactions. The master 104 may receive information describing a transaction, i.e. instructions to insert, update, or delete data in the collection. The master 104 may durably record the information in a log file, and then proceed to apply the transaction to the collection of data. Applying the transaction may, for example, comprise inserting a requested data item into the collection, deleting a specified item, and/or modifying an existing item in accordance with the instructions. Accordingly, there are at least two stages to the master's 104 processing of a transaction. In the first stage, a record of the transaction is durably recorded in a log file. In the second stage, the transaction is applied to the collection of data.

A transaction may comprise instructions for modifying a collection of data. In some instances, transactions may be expressed as one or more commands or statements, such as statements in structured query language ("SQL"). In some instances, transactions may be expressed via a series of protocol transmissions, such as open database connectivity ("ODBC") and the like. These examples are not intended to be limiting.

The replication peers 106, 108 may each maintain a replica of the collection of data. The first replication peer 106 may maintain a replica on a first storage device to with which the first replication peer 106 is in communication, and the second replication peer 108 may maintain a replica on a second storage device with which the second replication peer 108 is in communication. The replicas may be based on transaction data sent from the master 104 to each of the replication peers 106, 108. Each replica may also process the transaction data using a two-phased approach. In the first stage, a replication peer 106 may durably record the transaction data in a log file on a storage device to which it is connected. In a second stage, the replication peer 108 may apply the transaction to the replica. As was the case with the master's 104 application of the transaction, the replication peer 106 may insert, update, and/or delete data in the replica as indicated by the transaction.

Data may be retrieved from the collection by reader(s) 103 which may issue queries to the master 104 or replication peers 106, 108. Queries are typically handled by a database engine operative on each of the computing nodes 104, 106, 108. A database engine may comprise a query engine and a storage engine. Typically, the query engine processes requests to access data stored in the collection by formulating a plan of execution. The storage engine, typically, may process these instructions and in so doing retrieve data from the collection. The storage engine may also interface with storage devices, and may include functionality for applying transactions to the collection of data and for storing information describing the transactions to a log file.

The use of three nodes 104, 106, 108 in the distributed system 100 may contribute to the reliability of the distributed database system 100. If one of the nodes 108 encounters a fault or is otherwise interrupted, the other two nodes 104, 106 each continue to have and maintain a copy of the data, and consequently data loss is unlikely to occur. However, if an additional node 108 were to be interrupted, the data would be at greater risk.

A control plane 112 may, though an interruption monitoring process 114, identify interruption of the operation of the nodes 104, 106, 108. The control plane 112 may comprise a computing device which may perform, or equivalently cause to be performed, operations related to reserving, instantiating, and configuring computing node instances. The control plane 112 may also perform tasks related to the operation of the computing nodes 104, 106, 108 of the distributed database system, such as identifying interruptions in the replication process.

The control plane 112 may, for example, maintain a pool of computing node instances. The control plane 112 may withdraw a computing node instance from the pool and configure the instance. In response to determining that a computing node 104 106, 108 has been interrupted in its maintenance of a replica of the collection of data, the control plane 112 may reserve, initialize, and configure a computing node instance that may serve as a log-only peer 110.

The log-only peer 110 may be tasked, upon its initialization, with maintaining a subset of the transaction log maintained by the master 104. The subset may comprise those transactions at the "tail" of the log. The tail may refer to those transactions that have been durably recorded in a log file but have not yet been committed, or in other words applied to the collection of data maintained by the master 104. The log-only peer 110 may receive records corresponding to the log tail when the control plane 112 determines that the operation of a node 108 has been interrupted and, in response to the determination, initializes the log-only peer 110 and causes the master 104 to transmit transactions in its log tail to the log-only peer 110. The control plane 112 may, for example, configure the master to send the log tail to the log-only peer 110. The control plane 112 may also configure the master to send subsequently received transactions to the log-only peer 112.

A transaction may be committed by appropriately modifying the collection of data. The modifications may be based at least in part on instructions, such as SQL statements, associated with the transaction. A distributed database may commit a transaction based partly on achieving quorum, which may also be referred to as identifying or confirming quorum. Quorum refers to some number of nodes of the distributed database having made the transaction durable. When a sufficient number of nodes, such as at least two nodes, have made the transaction durable, it may be largely guaranteed that the changes associated with the transaction will eventually be applied to the underlying data. A transaction may typically be made durable on a given node by at least recording information describing the transaction in a transaction log.

The log-only peer 110 may durably record the transactions in a log file. The log-only peer 110 may be configured to be in communication with a storage device that has been sized in order to accommodate an expected volume of transactions for the length of time the operation of the replication peer 108 is expected to be interrupted. For example, if a typical outage length is 60 minutes, and 100 transactions are typically processed in a minute, the storage device to which the log-only peer 110 is connected may be sized to store information describing at least 6000 transactions of a typical size. The storage device need not be sized to also contain a replica of the data, since the purpose of the log-only peer 110 is primarily to durably record the log tail of the master's 104 transaction log.

Figure 1B:
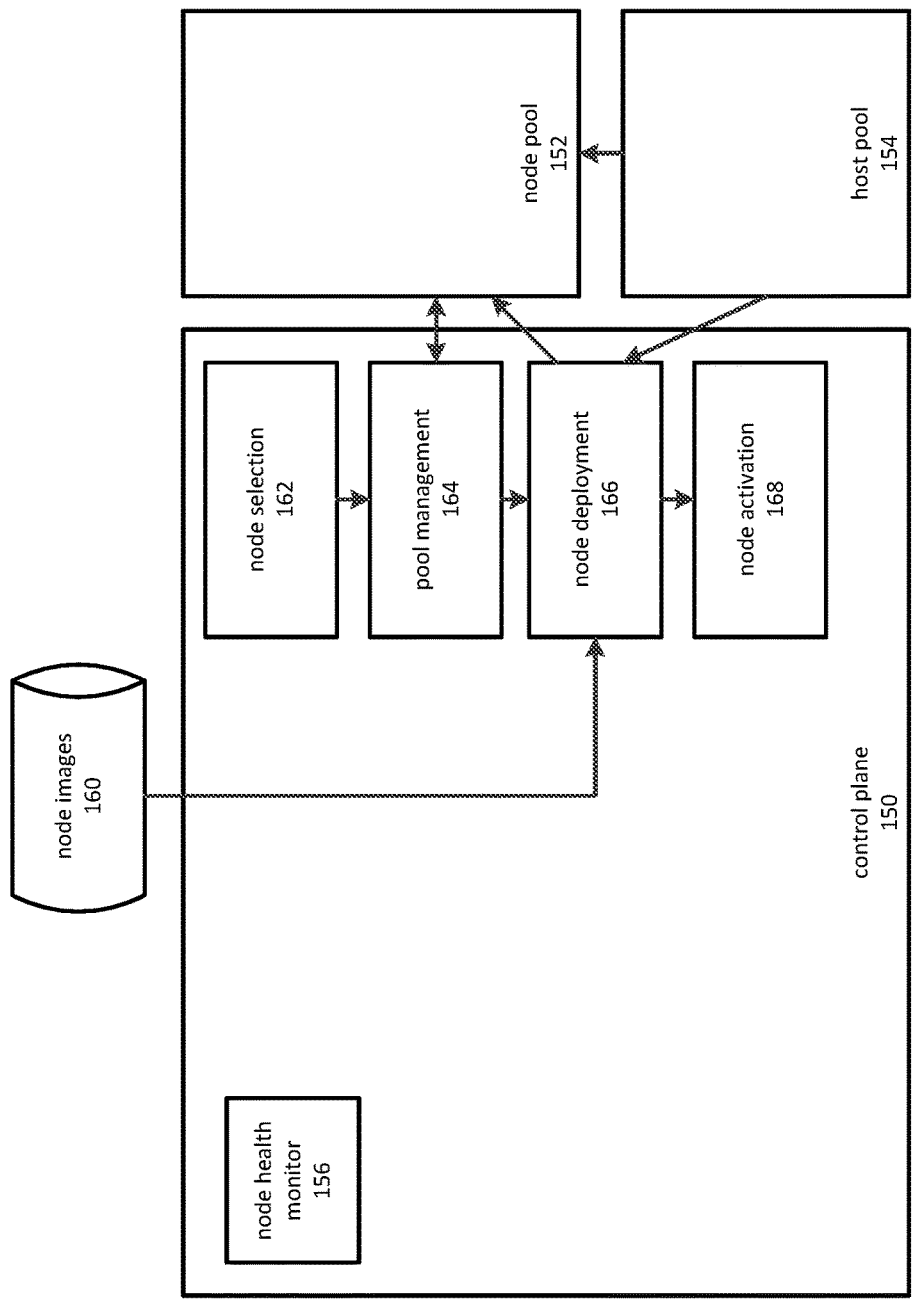
FIG. 1B is a block diagram depicting operation of a control plane to configure a distributed database system using a log-only peer.

The operation of a control plane may be further understood in view of FIG. 1B, which is a block diagram depicting operation of a control plane to configure a distributed database system using a log-only peer. A control plane 150 may perform operations for identifying node failures in a distributed database, configuring a log-only peer, and reconfiguring the distributed database system to make use of the log-only peer.

The control plane 150 may comprise a node health monitor module 156. The node health module 156 may further comprise means for querying and receiving status information pertaining to the nodes of a distributed database. For example, the health monitor module 156 may send test queries to the nodes of the distributed database and use the query responses, or lack thereof, to identify failures. Similarly, the health monitor module 156 may monitor the receipt of heartbeat messages from the nodes of the distributed database.

The health monitor module 156 may determine that a log-only peer has failed. in response to the failure, the control plane 150 may perform operations for configuring a log-only peer. The operations may involve the actions of one or more of the depicted modules of the control plane 150, including a node selection module 162, a pool management module 164, a node deployment module 166, and a node activation module 168.

A node selection module 162 may identify characteristics of a computing node suitable for hosting the log-only peer. As described herein, the capabilities of the computing node for a log-only peer may be comparatively less than that of a full-featured replication peer. The node selection module 162 may, for example, select processing and storage capacity sufficient to support operation of the log-only peer for a limited period of time, i.e. the length of time typically needed to replace a replication peer.

The pool management module 164 may receive parameters from the node selection module 162 and identify an existing computing node from a pool of computing nodes 152. Alternatively, the pool management module 164 may determine that no suitable node is available within the pool, or that no suitable node may be obtained within an acceptable period of time. The node deployment module 166 may then identify a suitable virtual machine host from a pool of available hosts 154. Using a repository of node images 160, the node deployment module 166 may obtain a virtual machine and apply an image compatible with the execution of the log-only peer. The virtual machine and image may be selected based on requirements set by the node selection module 162. In some cases, the instructions for executing the log-only peer may be pre-loaded onto the virtual machine. In other cases, the instructions may be added by running installation programs on the virtual machine.

Configuration of the log-only peer may be completed by the operations of the node activation module 168. The node activation module 168 may initialize the virtual machine, start execution of the log-only peer, and cause the master computing node of the distributed database to transmit replication data to the activated log-only peer.

At a later time, the control plane 150 may configure the distributed database to no longer make use of the log-only peer. The computing node on which the log-only peer executed may be returned, by the pool management module 164, to the node pool 152. Alternatively, the node may be deactivated without returning it to a pool. Note that in some cases, the node pool 152 and the pool management module 164 may be omitted, in which case nodes may be recreated from a baseline image each time they are needed.

Figure 2:
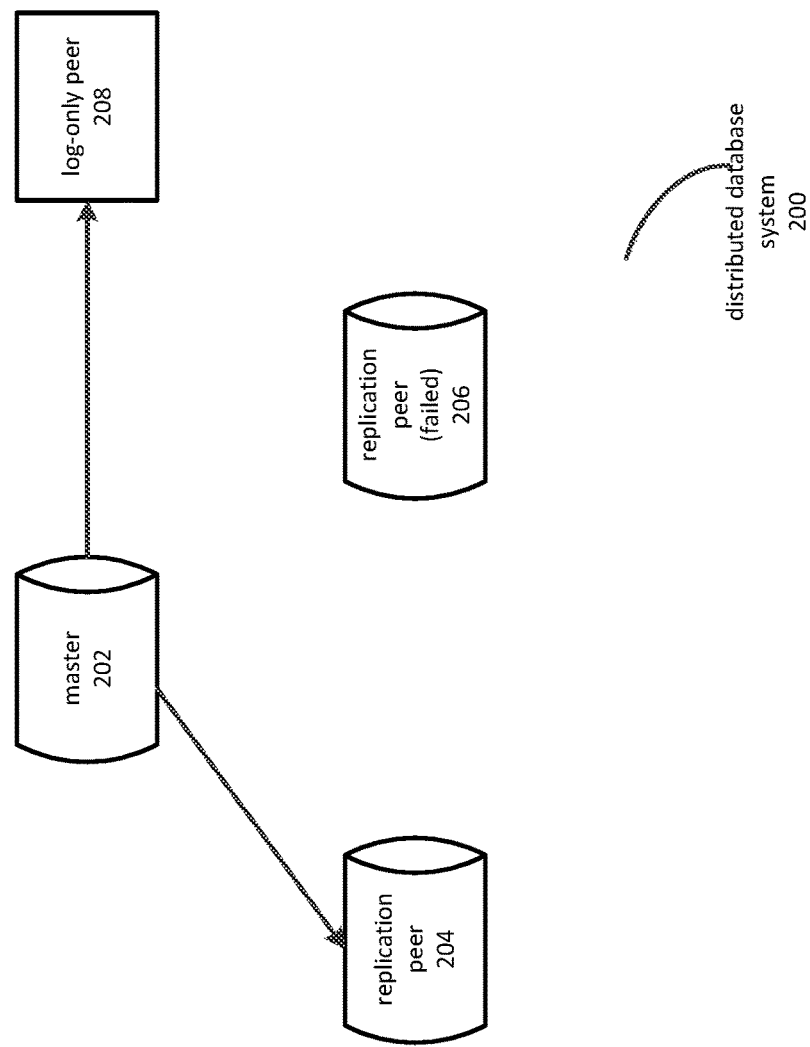
FIG. 2 is a block diagram depicting configuration of a distributed database system following a node failure.

FIG. 2 is a block diagram depicting configuration of a distributed database system following a node failure. A distributed system 200 may initially comprise a master computing node 202 and two other nodes acting as replication peers 204, 206. It may be the case, however, that the replication process of the replication peer 206 may be interrupted. For example, the replication peer 206 might lose power, encounter a software bug, and so on.

In response, the master 202 may be configured to utilize a log-only peer 208 as a replication partner, along with the pre-existing replication peer 204. The master 202 may continue to receive and process transactions modifying the state of the collection of data, and both the master 202 and the replication peer 204 may continue to process and respond to read-requests. The log-only peer 208 may durably record records describing transactions based on log data sent from the master 202 to the log-only peer, but the log-only peer 208 will not typically process queries. In some instances, for example, the software installed or activated on the log-only peer 208 may include software necessary to receive transaction data from the master 202 and record the transaction data in a log file, but not include software for processing queries. In some instances, this may correspond to including or activating a storage engine of a database management system, but not including or activating a query engine.

Figure 3:
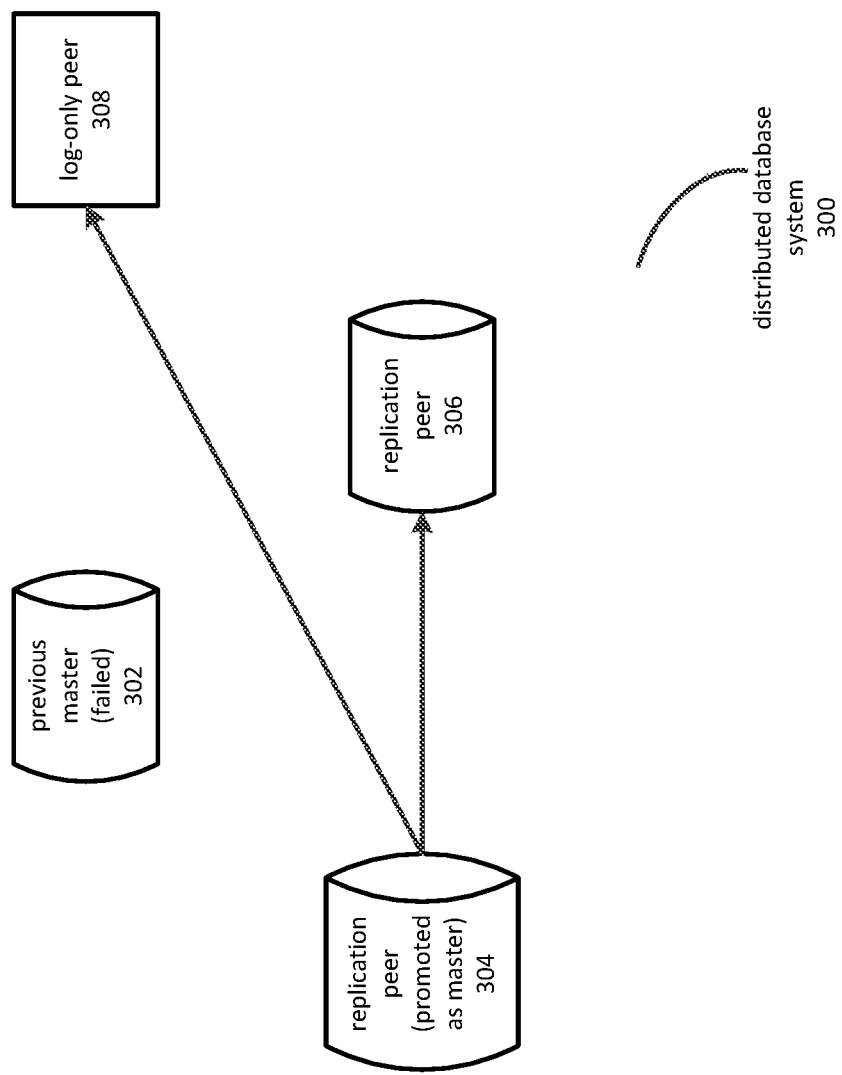
FIG. 3 is a block diagram depicting configuration of a distributed database system following a failure of the master node.

FIG. 3 is a block diagram depicting configuration of a distributed database management system following a failure of the master node. Similar to FIG. 2, in FIG. 3 the distributed database system 300 may initially comprise a master 302 and two replication peers 304, 306. However, subsequent to a failure of the original master 302, the replication peer 304 may have been promoted to act as a master.

The promoted master 304 may then replicate transaction data to the replication peer 306 and to a spot-instanced log-only peer 308. As was the case in FIG. 2, in FIG. 3 the log-only peer 308 may be added to the distributed database system 300 in response to the failure of the original master 302. The new master 304 may receive and process transactions modifying the collection of data, and both the new master 304 and the replication peer 306 may continue to respond to requests to retrieve data from the collection of data. The log-only peer 308 may maintain a copy of the initial log tail and subsequent transactions received by the new master 304.

Figure 4:
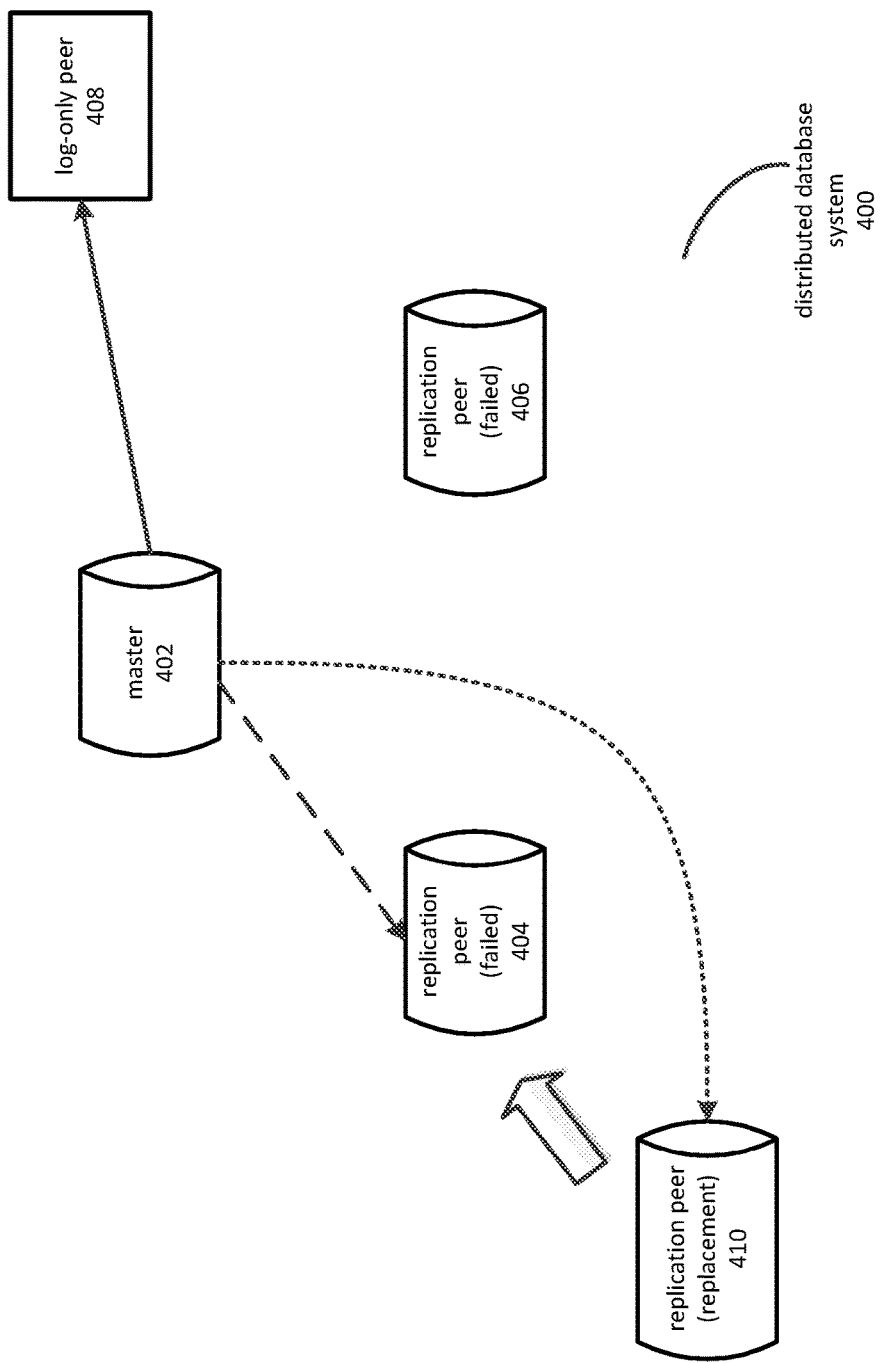
FIG. 4 is a block diagram depicting configuration of a distributed database system following a failure of two of three nodes.

FIG. 4 is a block diagram depicting configuration of a distributed database system following a failure of two of three nodes. The distributed database system 400 of FIG. 4 may initially comprise a master 402 and two replication peers 404, 406. However, in the example of FIG. 4, two of the nodes 404, 406 have failed, or more generally their participation in the replication process has been interrupted.

After the failure of the second of the two replication peers 404, 406, the distributed database system 400 may be in an undesirable state in which only one primary copy of the data, as maintained by the master node 402, is available. As described herein, the log-only peer 408 maintains a copy of the log tail, but not of the complete data set that is normally maintained by both the master node 402 and at least one replication peer.

In the example of FIG. 4, a control plane monitoring the distributed database system 400 might attempt to replace at least one of the failed replication peers 404, 406 as quickly as possible, since a failure of the master 402 would still render the system 400 non-operational.

A replacement replication peer 410 may therefore be configured by the control plane and deployed as rapidly as possible. One or more log-only peers, such as the depicted log-only peer 408, may continue to operate during this period. In some cases, as described herein, an existing log-only peer may be promoted to replication peer status if it has sufficient hardware capabilities, or may be reconfigured to have sufficient hardware capabilities. In any event, a full copy of data maintained by the master 402 would typically be copied to the replacement replication peer 410.

Figure 5:
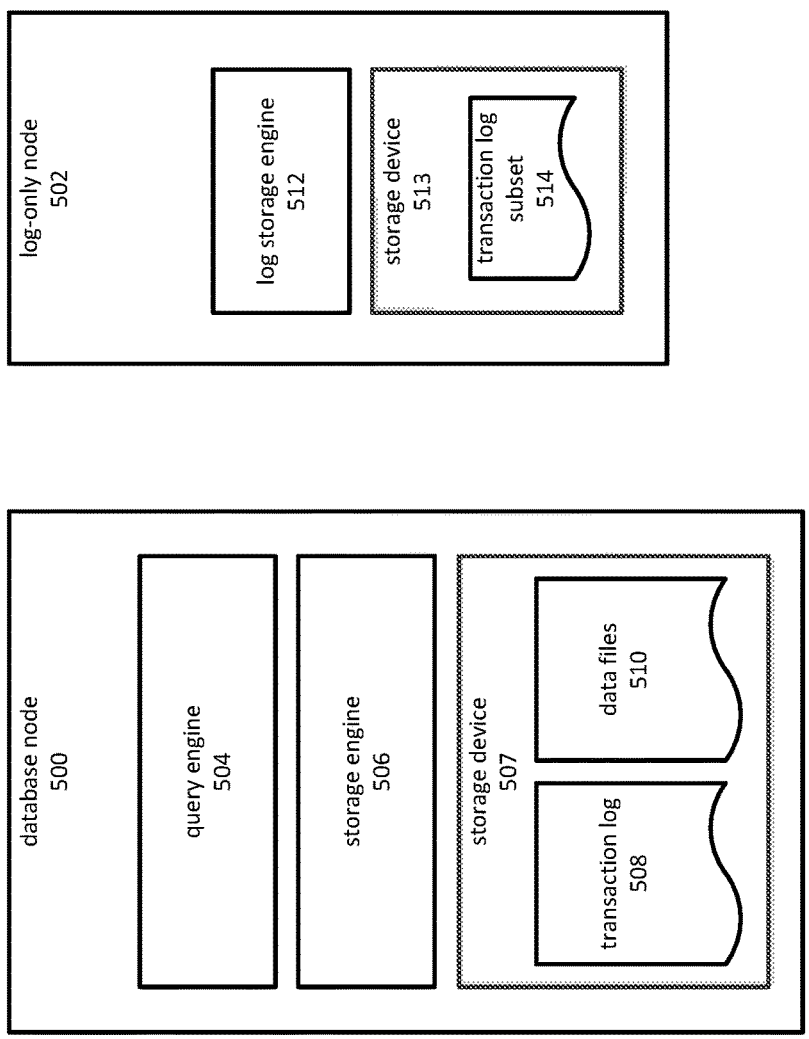
FIG. 5 is a block diagram depicting a database node and a log-only node.

FIG. 5 is a block diagram depicting a database node and a log-only node. The database node 500 may correspond, for example, to the master 104 or replication peers 106, 108 depicted in FIG. 1. The log-only node 502 may correspond to the log-only peer 110 depicted in FIG. 1.

A distributed database system might comprise a number of database nodes 500. The database node 500 might typically contain a query engine which receives requests to perform transactions and requests to retrieve data. A request to retrieve data may sometimes be described as a query, although the term query may also sometimes be used to describe requests to insert, update, or delete data from the collection of data. The query engine 504 may typically receive queries of either form and perform an initial processing stage, such as formulating a plan of execution for the query.

Another component of the database node 500 may be a storage engine 506, which may typically perform tasks such as interfacing with a storage device 507 with which the database node 500 is in communication. A database node 500 that includes a storage device 507 may be described as being in communication with the storage device. In some cases, however, the database node 500 may be in communication with an external storage device (not shown).

The storage engine 506 may interface with the storage device 507 to write data to a transaction log 508 and to data files 510. Note that in some cases the transaction log 508 and the data files 510 may be stored on different storage devices. However, for simplicity in depiction FIG. 5 depicts only a single storage device 507.

The storage device 507 of the database node 500 may be used by the database node 500 to store a transaction log 508 and data files 510 corresponding to the collection of data. When a transaction is requested, a record of it may be immediately stored in the transaction log 508. The transaction may then be applied to the collection of data, as reflected by the data files 510.

In contrast to the database node 500, the log-only node 502 may require fewer computing resources such as processor time or storage space. The log-only node 502 may be spot-instanced based on a reduced set of requirements compared to a database node 500. For example, the processor of the log-only node 502 may be sufficient to support a reduced set of database-related functionality. For example, in some cases the log-only node 502 might comprise a processor just sufficient for running a log storage engine 512. The log storage engine 512 might correspond to a reduced set of functionality compared to the storage engine 506 of the database node 500. Moreover, the log-only node 502 might not include a query engine 504, or the query engine 504 might be deactivated in the log-only node 502.

The storage device 513 of the log-only node 502 might be used to store a transaction log subset 514. The subset 514 might correspond to the "tail" of the transaction log 508, i.e. the portion of the transaction log 508 that has not yet been applied to the collection of data maintained in the data file 510. The log-only node 502 may therefore have reduced capacity requirements for the storage device 513 compared to the database node's 500 requirements for its storage device 507. The capacity of the storage device 513 with which the log-only node 502 is in communication may be based on the expected maximum size of the transaction log subset 514. The expected size may, in turn, be based on the number of transactions expected during a period of downtime of a failed computing node. Note that this method of estimating the capacity requirements of the log-only node's 502 storage device 513 assumes that the transaction log subset 514 is never truncated. However, the log-only node 502 may at times truncate the log to include only data that remains in the log tail of a database node 500. In other words, in some cases data for transactions that have been applied to a collection of data, as opposed to only being present in a log file, may be removed from the transaction log subset 514.

Figure 6:
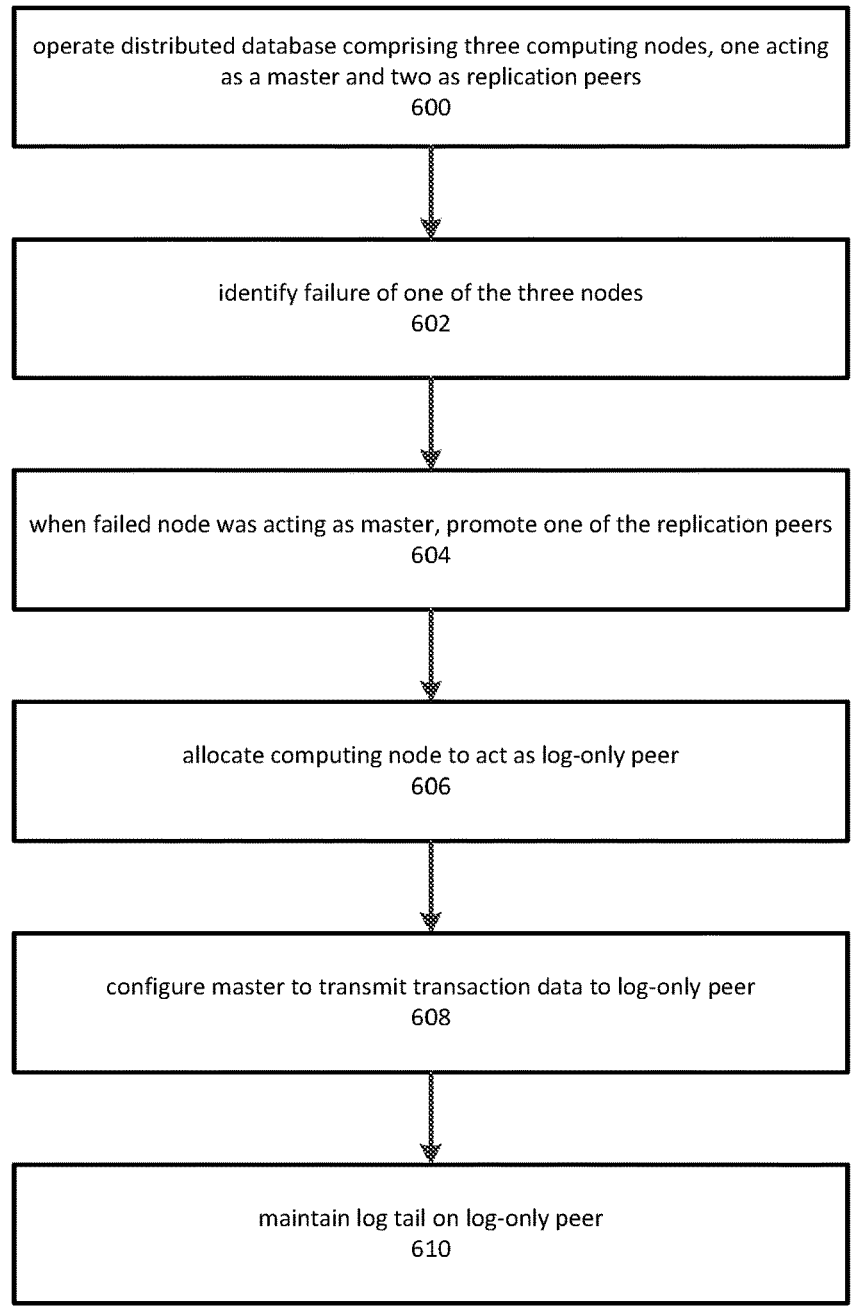
FIG. 6 is a flow diagram depicting operation of a distributed database using log-only peers.

FIG. 6 is a flow diagram depicting operation of a distributed database using log-only peers. Although depicted as a sequence of blocks, those of ordinary skill in the art will appreciate that the depicted order should not be construed as limiting the scope of the present disclosure and that at least some of the operations referred to in the depicted blocks may be altered, omitted, reordered, supplemented with additional operations, or performed in parallel.

Block 600 shows operating a distributed database system comprising three computing nodes, in which one acts as a master in a replication process and the other two act as replication peers. The computing node designated as the master may receive requests to modify data in a collection of data maintained on a storage device to which the master is in communication. The replication peers may maintain replicas of the collection by receiving information describing the transactions and applying equivalent changes to the replicas.

Block 602 shows that a control plane device may identify a failure of one of the computing nodes. In this context, failure may refer to various events or conditions which may cause the "failed" computing node to interrupt its maintenance of its replica of the collection. Example conditions include, but are not limited to, power failure, software failure, unintentional shutdown, maintenance operations, and so forth. The control plane device may employ various techniques for identifying failures, such as heartbeat detection, execution of diagnostic functions, and so forth.

Block 604 pertains to cases where the failed node was designated as a master in a replication process. When this is the case, a remaining computing node may be designated as a replacement master, and the process may continue. Note that a log-only node would not typically be designated as master, since a log-only node might not be configured with sufficient capacity or capability for performing the role of master. For example, the functionality of a log-only node might be limited to receiving and storing transaction log information, and to participating in quorum decisions.

Block 606 depicts allocating a log-only node to replace the failed node, at least insofar as log replication is concerned. As noted, the log-only node is not a full-featured replacement of a failed master or replication peer. However, as described herein, there may be cases in which a node that is initially configured as a log-only node is reconfigured to perform additional functions, to have additional storage or processing capacity, etc.

Block 608 depicts configuring the current master to transmit transaction data to the log-only peer. This may typically comprise altering information maintained by the master computing node regarding its peers in the replication group. The information may be modified so that references to the failed replication peer are replaced with references to the log-only peer.

The master may then send information describing transactions at the tail of its transaction log to the replication peer. The log tail may include those transactions that have been received by the master but not yet applied to a collection of data. The log tail may also refer to transactions for which quorum has not yet been achieved. The master may send an initial batch of transaction information to the log-only peer, representing all transactions that have not been applied to a collection of data or for which quorum has not yet been achieved. The master may receive additional transaction after sending this initial batch, and may forward information describing these subsequent transactions to the log-only peer.

As depicted by block 610, the log-only peer may maintain the log-tail information it receives from the master. The log-only peer may write the transaction information to a log file maintained on a storage device with which the log-only peer is in communication, or equivalently is part of the log-only peer. In some instances, the log file maintained by the log-only peer may be allowed to grow indefinitely. The storage device may, for example, be sized to accommodate information describing a predicted number of transactions during an expected downtime period of the failed node.

Figure 7:
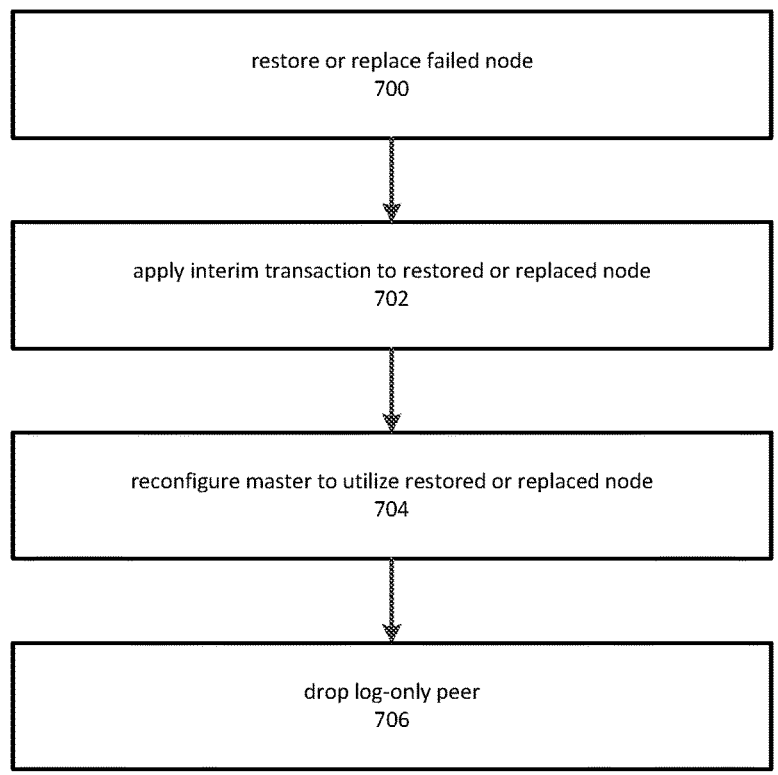
FIG. 7 is a flow diagram depicting restoration of a failed replication peer subsequent to the use of a log-only node

FIG. 7 is a flow diagram depicting restoration of a failed replication peer subsequent to the use of a log-only node. Although depicted as a sequence of blocks, those of ordinary skill in the art will appreciate that the depicted order should not be construed as limiting the scope of the present disclosure and that at least some of the operations referred to in the depicted blocks may be altered, omitted, reordered, supplemented with additional operations, or performed in parallel.

Block 700 depicts that the failed master computing node or replication peer may be restored to operation or replaced. During the period of time in which the restoration or replacement is underway, a log-only node may have been accumulating transaction log information and participating in quorum decisions. As depicted by block 702, this information may, in some instances, be used to help the restored or replaced replication peer catch up to the current master. In some cases, this information is not used. The transaction log of the master, for example, may be used.

In some cases, however, the log-only node may be promoted to a be a replication peer. This may comprise adding additional processing and/or storage capacity to the log-only node, acting a query engine on the log-only node, creating an initial replica of the collection of data maintained by the master, and so on.

Block 704 depicts that the master may be reconfigured to treat the restored or replaced computing node as a replication peer. This may involve, for example, modifying the master's replication configuration so that references to the log-only node are replaced with references to the restored or replaced replication peer.

Block 706 depicts that the log-only peer may then be dropped. In this context, "dropped" refers to stopping, at least temporarily, the use of the computing node instance on which the log-only peer was executing. The storage space associated with the log-only peer may be freed for other uses. In some embodiments, a pool of computing node instances may be maintained. When creating a log-only peer, an instance may be drawn from the pool. Instances in the pool may be pre-configured as log-only peers, or they may be configured as log-only peers on an as-needed basis. When a log-only peer is dropped, the underlying computing node instance may be returned to the pool.

Figure 8:
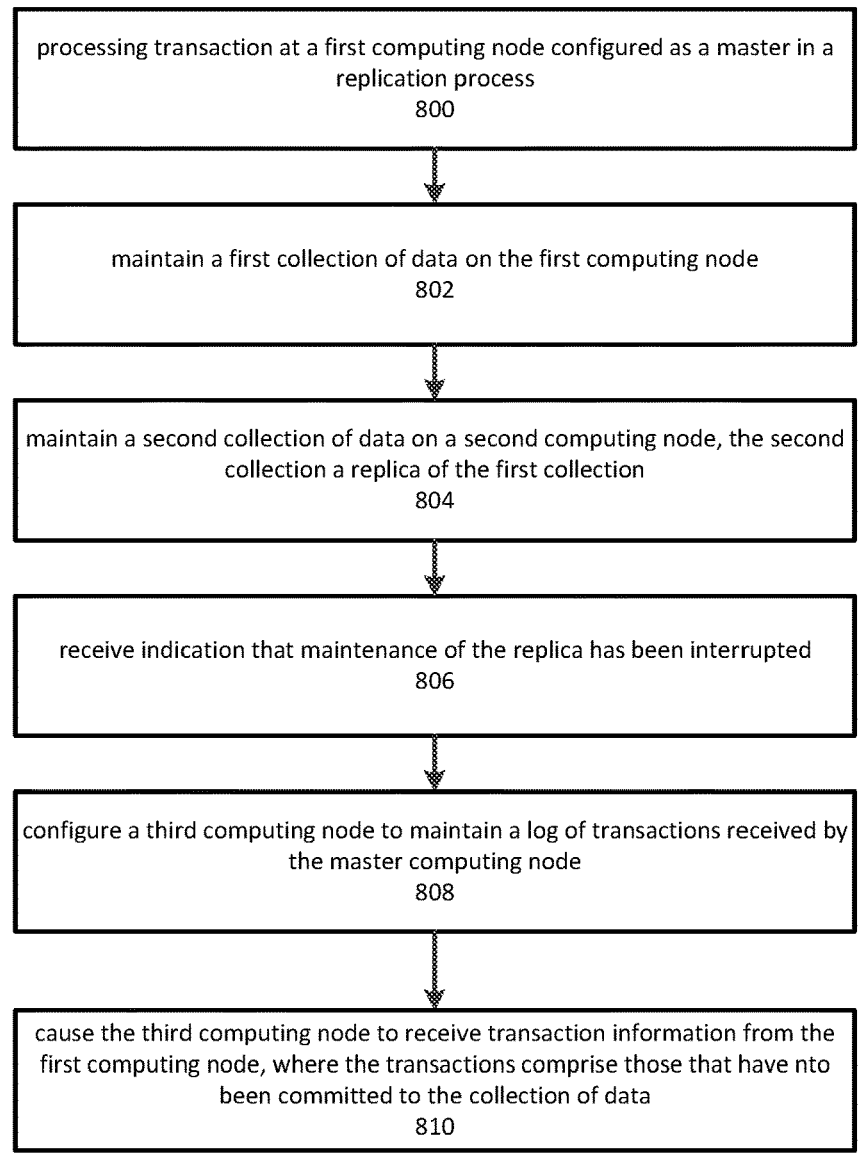
FIG. 8 depicts an example of a process for operating a distributed database.

FIG. 8 depicts an example of a process for operating a distributed database. Although depicted as a sequence of blocks, those of ordinary skill in the art will appreciate that the depicted order should not be construed as limiting the scope of the present disclosure and that at least some of the operations referred to in the depicted blocks may be altered, omitted, reordered, supplemented with additional operations, or performed in parallel.

Block 800 depicts processing transactions at a first computing node configured as a master in a replication process. Typically, the replication process may initially involve the first computing node acting as a master, and two additional nodes each of which acts as a replication peer. As depicted by block 802, the first computing node may maintain a first collection of data. This may comprise applying the transaction to the first collection and sending information describing the transactions to each replication peer.

As depicted by block 804, a second collection of data may be maintained on a second computing node, where the second computing node may be a replication peer, or possibly a former master node. The second collection of data may be a replica of at least a subset of the first collection of data. The second computing node may apply the transaction information received from the master to keep the second collection in synch with the first collection.

Block 806 depicts receiving an indication that maintenance of the replica has been interrupted. This may, for example, be the result of a failure or fault of some sort that occurs on the second computing node. The indication might, for example, comprise the results of a heartbeat test or some other diagnostic function.

Block 808 depicts configuring a third computing node to maintain a log of transactions received by the master computing node. The third computing node may act as a log-only peer, as described herein. The configuration may be initiated by a control plane device upon the device's receiving of the indication that the maintenance of the replica has been, or will be, interrupted.

Block 810 depicts causing the third computing node to receive transactions from the first computing node. The transaction may be those that have been received by the first computing node but that have not yet been committed to the collection of data. The third computing node, upon receiving the information, may store it in a log file.

In a further example, the control plane may obtain a reservation of the computing node instance. The reservation may be for a length of time corresponding to the expected period of downtime for the second computing node, or the estimated amount of time needed to replace the second computing node. Obtaining a reservation may comprise interaction with a resource scheduling module that performs operations such as identifying available computing node instances, predicting present and future demand for computing node instances, and accumulating computing node instances in a pool to meet the present and future demands.

In a further example, the control plane may activate the second computing node upon determining that it is once again capable of acting as a replication peer. The computing node instance acting as the log-only peer may then be returned to a pool of such instances.

In another example, the control plane may receive information indicating that the second computing node is to be deactivated. For example, the control plane may obtain information causing it to determine that the second computing node cannot be repaired, and thus will not resume operating as a replication peer. The control plane, in this instance, may determine that the log-only peer may be promoted to act as a full-fledged replication peer. The control plane may then obtain additional processor and storage resources for the computing node instance acting as the log-only peer. The control plane may further perform operations to configure the computing node instance to act as a full-fledged replication peer, such as activating a query engine. Moreover, the promoted instance may be configured to maintain a replica of the primary collection of data. The replica may be based at least in part on the transaction log data already contained in the instance's log file.

Figure 9:
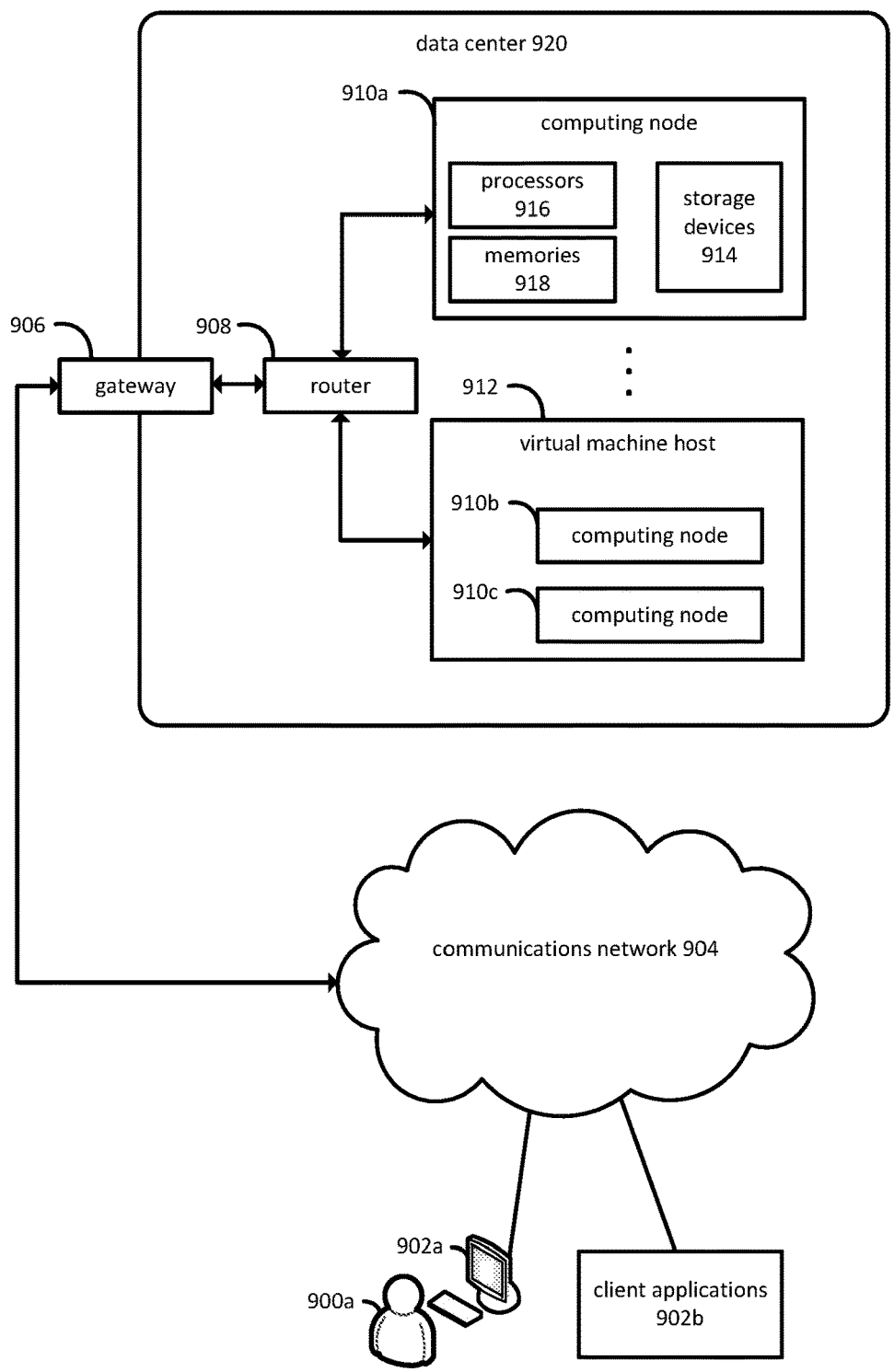
FIG. 9 is a block diagram depicting an embodiment of a computing environment in which aspects of the present disclosure may be practiced.

FIG. 9 is a diagram depicting an example of a distributed computing environment on which aspects of the present invention may be practiced. Various users 900a may interact with various client applications, operating on any type of computing device 902a, to communicate over communications network 904 with processes executing on various computing nodes 910a, 910b, and 910c within a data center 920. Alternatively, client applications 902b may communicate without user intervention. Communications network 904 may comprise any combination of communications technology, including the Internet, wired and wireless local area networks, fiber optic networks, satellite communications, and so forth. Any number of networking protocols may be employed.

Communication with processes executing on the computing nodes 910a, 910b, and 910c, operating within data center 920, may be provided via gateway 906 and router 908. Numerous other network configurations may also be employed. Although not explicitly depicted in FIG. 9, various authentication mechanisms, web service layers, business objects, or other intermediate layers may be provided to mediate communication with the processes executing on computing nodes 910a, 910b, and 910c. Some of these intermediate layers may themselves comprise processes executing on one or more of the computing nodes. Computing nodes 910a, 910b, and 910c, and processes executing thereon, may also communicate with each other via router 908. Alternatively, separate communication paths may be employed. In some embodiments, data center 920 may be configured to communicate with additional data centers, such that the computing nodes and processes executing thereon may communicate with computing nodes and processes operating within other data centers.

Computing node 910a is depicted as residing on physical hardware comprising one or more processors 916, one or more memories 918, and one or more storage devices 914. Processes on computing node 910a may execute in conjunction with an operating system or alternatively may execute as a bare-metal process that directly interacts with physical resources, such as processors 916, memories 918, or storage devices 914.

Computing nodes 910b and 910c are depicted as operating on virtual machine host 912, which may provide shared access to various physical resources, such as physical processors, memory, and storage devices. Any number of virtualization mechanisms might be employed to host the computing nodes.

The various computing nodes depicted in FIG. 9 may be configured to host web services, database management systems, business objects, monitoring and diagnostic facilities, and so forth. A computing node may refer to various types of computing resources, such as personal computers, servers, clustered computing devices, and so forth. A computing node may, for example, refer to various computing devices, such as cell phones, smartphones, tablets, embedded device, and so on. When implemented in hardware form, computing nodes are generally associated with one or more memories configured to store computer-readable instructions and one or more processors configured to read and execute the instructions. A hardware-based computing node may also comprise one or more storage devices, network interfaces, communications buses, user interface devices, and so forth. Computing nodes also encompass virtualized computing resources, such as virtual machines implemented with or without a hypervisor, virtualized bare-metal environments, and so forth. A virtualization-based computing node may have virtualized access to hardware resources as well as non-virtualized access. The computing node may be configured to execute an operating system as well as one or more application programs. In some embodiments, a computing node might also comprise bare-metal application programs.

Figure 10:
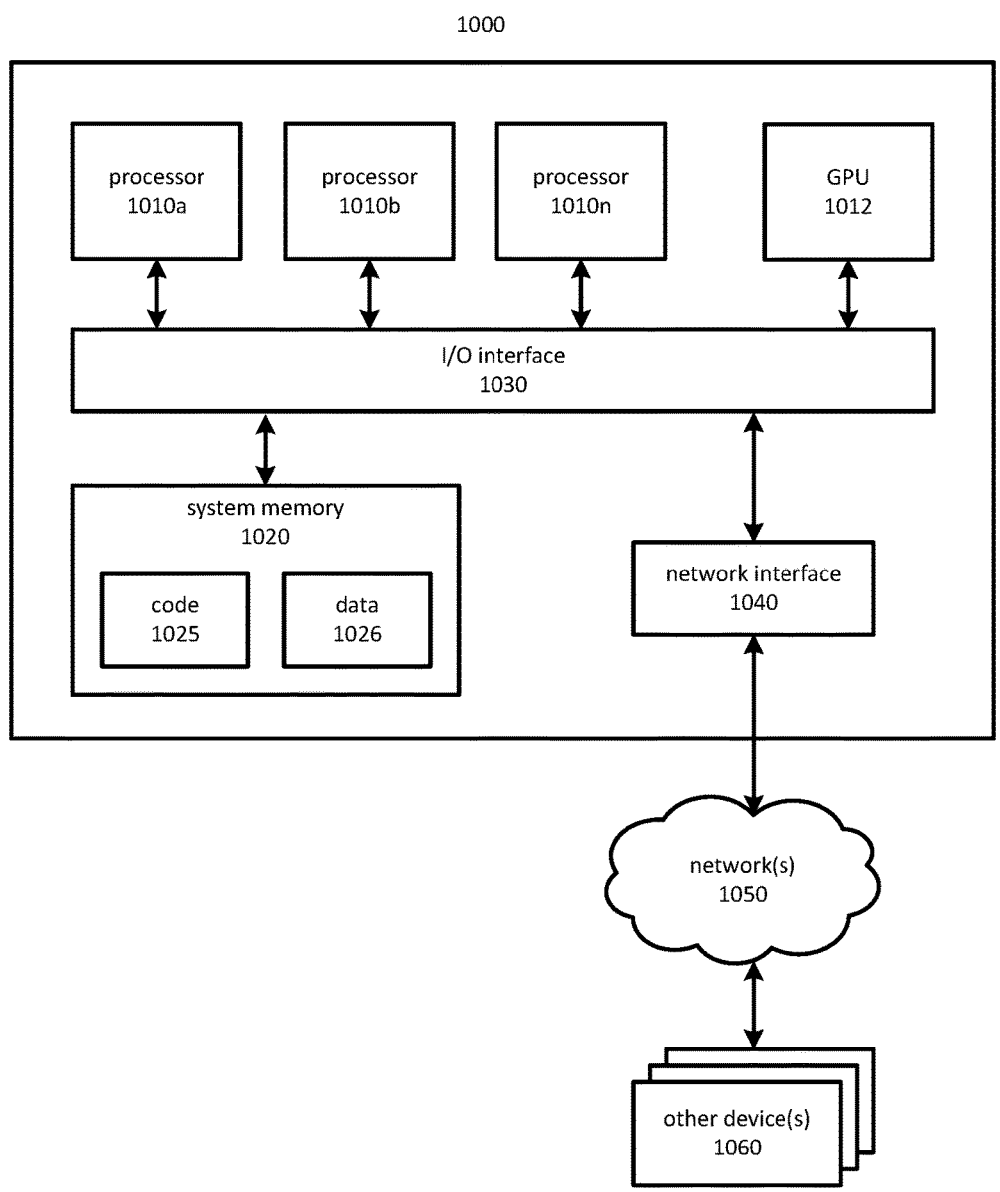
FIG. 10 is a block diagram depicting an embodiment of a computing system on which aspects of the present disclosure may be practiced.

In at least some embodiments, a server that implements a portion or all of one or more of the technologies described herein may include a general-purpose computer system that includes or is configured to access one or more computer-accessible media. FIG. 10 depicts a general-purpose computer system that includes or is configured to access one or more computer-accessible media. In the illustrated embodiment, computing device 1000 includes one or more processors 1010a, 1010b, and/or 1010n (which may be referred herein singularly as a processor 1010 or in the plural as the processors 1010) coupled to a system memory 1020 via an input/output ("I/O") interface 1030. Computing device 1000 further includes a network interface 1040 coupled to I/O interface 1030.

In various embodiments, computing device 1000 may be a uniprocessor system including one processor 1010 or a multiprocessor system including several processors 1010 (e.g., two, four, eight, or another suitable number). Processors 1010 may be any suitable processors capable of executing instructions. For example, in various embodiments, processors 810 may be general-purpose or embedded processors implementing any of a variety of instruction set architectures ("ISAs"), such as the x86, PowerPC, SPARC or MIPS ISAs, or any other suitable ISA. In multiprocessor systems, each of processors 1010 may commonly, but not necessarily, implement the same ISA.

In some embodiments, a graphics processing unit ("GPU") 1012 may participate in providing graphics rendering and/or physics processing capabilities. A GPU may, for example, comprise a highly parallelized processor architecture specialized for graphical computations. In some embodiments, processors 1010 and GPU 1012 may be implemented as one or more of the same type of device.

System memory 1020 may be configured to store instructions and data accessible by processor(s) 1010. In various embodiments, system memory 1020 may be implemented using any suitable memory technology, such as static random access memory ("SRAM"), synchronous dynamic RAM ("SDRAM"), nonvolatile/Flash®-type memory, or any other type of memory. In the illustrated embodiment, program instructions and data implementing one or more desired functions, such as those methods, techniques, and data described above, are shown stored within system memory 1020 as code 1025 and data 1026.

In one embodiment, I/O interface 1030 may be configured to coordinate I/O traffic between processor 1010, system memory 1020, and any peripherals in the device, including network interface 1040 or other peripheral interfaces. In some embodiments, I/O interface 1030 may perform any necessary protocol, timing or other data transformations to convert data signals from one component (e.g., system memory 1020) into a format suitable for use by another component (e.g., processor 1010). In some embodiments, I/O interface 1030 may include support for devices attached through various types of peripheral buses, such as a variant of the Peripheral Component Interconnect ("PCI") bus standard or the Universal Serial Bus ("USB") standard, for example. In some embodiments, the function of I/O interface 1030 may be split into two or more separate components, such as a north bridge and a south bridge, for example. Also, in some embodiments some or all of the functionality of I/O interface 1030, such as an interface to system memory 1020, may be incorporated directly into processor 1010.

Network interface 1040 may be configured to allow data to be exchanged between computing device 1000 and other device or devices 1060 attached to a network or networks 1050, such as other computer systems or devices, for example. In various embodiments, network interface 1040 may support communication via any suitable wired or wireless general data networks, such as types of Ethernet networks, for example. Additionally, network interface 1040 may support communication via telecommunications/telephony networks, such as analog voice networks or digital fiber communications networks, via storage area networks, such as Fibre Channel SANs (storage area networks), or via any other suitable type of network and/or protocol.

In some embodiments, system memory 1020 may be one embodiment of a computer-accessible medium configured to store program instructions and data as described above for implementing embodiments of the corresponding methods and apparatus. However, in other embodiments, program instructions and/or data may be received, sent, or stored upon different types of computer-accessible media. Generally speaking, a computer-accessible medium may include non-transitory storage media or memory media, such as magnetic or optical media, e.g., disk or DVD/CD coupled to computing device 1000 via I/O interface 1030. A non-transitory computer-accessible storage medium may also include any volatile or non-volatile media, such as RAM (e.g., SDRAM, DDR SDRAM, RDRAM, SRAM, etc.), ROM, etc., that may be included in some embodiments of computing device 1000 as system memory 1020 or another type of memory. Further, a computer-accessible medium may include transmission media or signals, such as electrical, electromagnetic or digital signals, conveyed via a communication medium, such as a network and/or a wireless link, such as those that may be implemented via network interface 1040. Portions or all of multiple computing devices, such as those illustrated in FIG. 10, may be used to implement the described functionality in various embodiments; for example, software components running on a variety of different devices and servers may collaborate to provide the functionality. In some embodiments, portions of the described functionality may be implemented using storage devices, network devices or special-purpose computer systems, in addition to or instead of being implemented using general-purpose computer systems. The term "computing device," as used herein, refers to at least all these types of devices and is not limited to these types of devices.

A compute node, which may be referred to also as a computing node, may be implemented on a wide variety of computing environments, such as tablet computers, personal computers, smartphones, game consoles, commodity-hardware computers, virtual machines, web services, computing clusters, and computing appliances. Any of these computing devices or environments may, for convenience, be described as compute nodes or as computing nodes.

A network set up by an entity, such as a company or a public sector organization, to provide one or more web services (such as various types of cloud-based computing or storage) accessible via the Internet and/or other networks to a distributed set of clients may be termed a provider network. Such a provider network may include numerous data centers hosting various resource pools, such as collections of physical and/or virtualized computer servers, storage devices, networking equipment, and the like, needed to implement and distribute the infrastructure and web services offered by the provider network. The resources may in some embodiments be offered to clients in various units related to the web service, such as an amount of storage capacity for storage, processing capability for processing, as instances, as sets of related services, and the like. A virtual computing instance may, for example, comprise one or more servers with a specified computational capacity (which may be specified by indicating the type and number of CPUs, the main memory size, and so on) and a specified software stack (e.g., a particular version of an operating system, which may in turn run on top of a hypervisor).

A number of different types of computing devices may be used singly or in combination to implement the resources of the provider network in different embodiments, including general-purpose or special-purpose computer servers, storage devices, network devices, and the like. In some embodiments a client or user may be provided direct access to a resource instance, e.g., by giving a user an administrator login and password. In other embodiments the provider network operator may allow clients to specify execution requirements for specified client applications and schedule execution of the applications on behalf of the client on execution platforms (such as application server instances, Java™ virtual machines ("JVMs"), general-purpose or special-purpose operating systems, platforms that support various interpreted or compiled programming languages, such as Ruby, Perl, Python, C, C++, and the like, or high-performance computing platforms) suitable for the applications, without, for example, requiring the client to access an instance or an execution platform directly. A given execution platform may utilize one or more resource instances in some implementations; in other implementations multiple execution platforms may be mapped to a single resource instance.

In many environments, operators of provider networks that implement different types of virtualized computing, storage and/or other network-accessible functionality may allow customers to reserve or purchase access to resources in various resource acquisition modes. The computing resource provider may provide facilities for customers to select and launch the desired computing resources, deploy application components to the computing resources, and maintain an application executing in the environment. In addition, the computing resource provider may provide further facilities for the customer to quickly and easily scale up or scale down the numbers and types of resources allocated to the application, either manually or through automatic scaling, as demand for or capacity requirements of the application change. The computing resources provided by the computing resource provider may be made available in discrete units, which may be referred to as instances. An instance may represent a physical server hardware platform, a virtual machine instance executing on a server, or some combination of the two. Various types and configurations of instances may be made available, including different sizes of resources executing different operating systems ("OS") and/or hypervisors, and with various installed software applications, runtimes, and the like. Instances may further be available in specific availability zones, representing a logical region, a fault tolerant region, a data center, or other geographic location of the underlying computing hardware, for example. Instances may be copied within an availability zone or across availability zones to improve the redundancy of the instance, and instances may be migrated within a particular availability zone or across availability zones. As one example, the latency for client communications with a particular server in an availability zone may be less than the latency for client communications with a different server. As such, an instance may be migrated from the higher latency server to the lower latency server to improve the overall client experience.

In some embodiments the provider network may be organized into a plurality of geographical regions, and each region may include one or more availability zones. An availability zone (which may also be referred to as an availability container) in turn may comprise one or more distinct locations or data centers, configured in such a way that the resources in a given availability zone may be isolated or insulated from failures in other availability zones. That is, a failure in one availability zone may not be expected to result in a failure in any other availability zone. Thus, the availability profile of a resource instance is intended to be independent of the availability profile of a resource instance in a different availability zone. Clients may be able to protect their applications from failures at a single location by launching multiple application instances in respective availability zones. At the same time, in some implementations inexpensive and low latency network connectivity may be provided between resource instances that reside within the same geographical region (and network transmissions between resources of the same availability zone may be even faster).

Each of the processes, methods, and algorithms described in the preceding sections may be embodied in, and fully or partially automated by, code modules executed by one or more computers or computer processors. The code modules may be stored on any type of non-transitory computer-readable medium or computer storage device, such as hard drives, solid state memory, optical disc, and/or the like. The processes and algorithms may be implemented partially or wholly in application-specific circuitry. The results of the disclosed processes and process steps may be stored, persistently or otherwise, in any type of non-transitory computer storage, such as, e.g., volatile or non-volatile storage.

The various features and processes described above may be used independently of one another, or may be combined in various ways. All possible combinations and sub-combinations are intended to fall within the scope of this disclosure. In addition, certain methods or process blocks may be omitted in some implementations. The methods and processes described herein are also not limited to any particular sequence, and the blocks or states relating thereto can be performed in other sequences that are appropriate. For example, described blocks or states may be performed in an order other than that specifically disclosed, or multiple blocks or states may be combined in a single block or state. The example blocks or states may be performed in serial, in parallel, or in some other manner. Blocks or states may be added to or removed from the disclosed example embodiments. The example systems and components described herein may be configured differently than described. For example, elements may be added to, removed from, or rearranged compared to the disclosed example embodiments.

It will also be appreciated that various items are illustrated as being stored in memory or on storage while being used, and that these items or portions thereof may be transferred between memory and other storage devices for purposes of memory management and data integrity. Alternatively, in other embodiments some or all of the software modules and/or systems may execute in memory on another device and communicate with the illustrated computing systems via inter-computer communication. Furthermore, in some embodiments, some or all of the systems and/or modules may be implemented or provided in other ways, such as at least partially in firmware and/or hardware, including, but not limited to, one or more application-specific integrated circuits ("ASICs"), standard integrated circuits, controllers (e.g., by executing appropriate instructions, and including microcontrollers and/or embedded controllers), field-programmable gate arrays ("FPGAs"), complex programmable logic devices ("CPLDs"), etc. Some or all of the modules, systems, and data structures may also be stored (e.g., as software instructions or structured data) on a computer-readable medium, such as a hard disk, a memory, a network, or a portable media article to be read by an appropriate device or via an appropriate connection. The systems, modules, and data structures may also be transmitted as generated data signals (e.g., as part of a carrier wave or other analog or digital propagated signal) on a variety of computer-readable transmission media, including wireless-based and wired/cable-based media, and may take a variety of forms (e.g., as part of a single or multiplexed analog signal, or as multiple discrete digital packets or frames). Such computer program products may also take other forms in other embodiments. Accordingly, the present invention may be practiced with other computer system configurations.

Conditional language used herein, such as, among others, "can," "could," "might," "may," "e.g.," and the like, unless specifically stated otherwise, or otherwise understood within the context as used, is generally intended to convey that certain embodiments include, while other embodiments do not include, certain features, elements, and/or steps. Thus, such conditional language is not generally intended to imply that features, elements, and/or steps are in any way required for one or more embodiments or that one or more embodiments necessarily include logic for deciding, with or without author input or prompting, whether these features, elements and/or steps are included or are to be performed in any particular embodiment. The terms "comprising," "including," "having," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list.

While certain example embodiments have been described, these embodiments have been presented by way of example only, and are not intended to limit the scope of the inventions disclosed herein. Thus, nothing in the foregoing description is intended to imply that any particular feature, characteristic, step, module, or block is necessary or indispensable. Indeed, the novel methods and systems described herein may be embodied in a variety of other forms; furthermore, various omissions, substitutions, and changes in the form of the methods and systems described herein may be made without departing from the spirit of the inventions disclosed herein. The accompanying claims and their equivalents are intended to cover such forms or modifications as would fall within the scope and spirit of certain of the inventions disclosed herein.

What is claimed is:

1. A system, comprising:
    a first computing node in communication with a first storage device, wherein the first computing node receives information indicative of a plurality of transactions, the plurality of transactions comprising instructions for modifying a first collection of data stored on the first storage device;
    a second computing node in communication with a second storage device, wherein the second computing node maintains a second collection of data on the second storage device, the second collection corresponding to at least a subset of the first collection; and
    a computing device that at least:
        receives information indicative of an interruption of maintenance of the second collection of data by the second computing node;
        configures a third computing node to be operable to maintain, on a third storage device, a log of a subset of the plurality of transactions, wherein the third computing node does not maintain the collection of data and is sized to maintain the log of the subset of the plurality of transactions during the interruption;
        causes the third computing node to receive information indicative of the subset of the plurality of transactions, the subset comprising transactions that have not been committed to the collection of data maintained on the first storage device, wherein the third computing node stores the information indicative of the subset of the plurality of transactions on the third storage device; and
        causes the third computing node to participate in a quorum decision based at least in part on the information indicative of the subset of the plurality of transactions.

2. The system of claim 1, wherein the third storage device has capacity sufficient for storing information indicative of transactions received during an expected length of the interruption of maintenance of the second collection of data.

3. The system of claim 1, wherein the quorum decision is based at least in part on information indicative of a first transaction of the subset of the plurality of transactions being stored on both the first storage device and the third storage device.

4. The system of claim 1, wherein information indicative of the subset of the plurality of transactions corresponds to transactions for which quorum has not been confirmed.

5. The system of claim 1, wherein the computing device at least:
    obtains the third computing node from a pool of computing node instances; and
    initializes the third computing node to receive the information indicative of the transactions and to store the information on the third storage device.

6. A method of operating a distributed database, comprising:
    maintaining, by a first computing node, a first collection of data;
    maintaining, by a second computing node, a second collection of data corresponding to at least a subset of the first collection of data;
    identifying, by a computing device, an interruption of maintenance of the second collection of data by the second computing node;
    configuring a third computing device for maintaining a log file on a storage device, wherein the third computing device is configured to have a capacity based on an expected size of the log file during the interruption, the capacity less than either of the first and second computing nodes; and
    configuring, by the computing device, the first computing node to send, to a third computing node, information indicative of transactions that have not been applied to the first collection of data, wherein the third computing node stores the information indicative of the transactions in a log file on the storage device and participates in quorum decisions based at least in part on the information indicative of the transactions.

7. The method of claim 6, wherein the storage device is sized to have capacity sufficient for storing information indicative of transactions received while maintenance of the second collection of data is interrupted.

8. The method of claim 6, further comprising:
    obtaining the third computing node from a pool of computing node instances; and
    initializing the third computing node to receive the information indicative of the transactions and to store the information in the log file.

9. The method of claim 8, further comprising:
    activating the second computing node; and
    returning the third computing node to the pool of computing node instances.

10. The method of claim 6, further comprising:
    obtaining a reservation of computing resources for operating the third computing node, the reservation for a length of time corresponding to a predicted period of the interruption of maintenance of the second collection of data.

11. The method of claim 6, further comprising:
sending to the third computing node the information indicative of transactions that have not been applied to the first collection of data; and
applying, subsequent to the sending, the transactions to the first collection of data.

12. The method of claim 6, further comprising:
receiving, by the computing device, information indicative of a deactivation of the second computing node; and
configuring the third computing node to maintain a third collection of data, the third collection of data created based at least in part on the log file.

13. The method of claim 6, further comprising:
activating a query engine on the third computing node in response to receiving information indicative of a deactivation of the second computing node.

14. The method of claim 6, wherein the first computing node acts as a master in a replication group.

15. A non-transitory computer-readable storage medium having stored thereon executable instructions that, upon execution by a computing device, cause the computing device at least to:
receive, from a first computing node maintaining a collection of data, information indicative of a first plurality of transactions received by the first computing node, the information indicative of the plurality of transactions sent in response to determining that maintenance of a replica of the collection of data by a second computing node has been interrupted and that the plurality of transactions has not been applied to the collection of data;
store the information indicative of the first plurality of transactions on a storage device, wherein the storage device is selected based at least in part on a number of transactions predicted during an expected length of the interruption;
receive, from the first computing node, information indicative of a second plurality of transactions received by the first computing node subsequent to the first plurality of transactions;
store the information indicative of the second plurality of transactions on the storage device; and
send, to the first computing node, information indicative of a quorum decision, the quorum decision based at least in part on the information indicative of the first and second plurality of transactions stored on the storage device.

16. The non-transitory computer-readable storage medium of claim 15, wherein the storage device is selected based at least in part on the storage device having capacity sufficient for storing information indicative of transactions received during an expected length of interruption of the maintenance of the replica of the collection of data.

17. The non-transitory computer-readable storage medium of claim 15, comprising further instructions that, upon execution by the computing device, cause the computing device at least to:
activate a query engine in response to information indicative of the second computing node not resuming maintenance of the replica of the collection of data.

18. The non-transitory computer-readable storage medium of claim 15, comprising further instructions that, upon execution by the computing device, cause the computing device at least to:
form a second replica of the collection of data, the second replica based at least in part on the information indicative of the first and second pluralities of transactions, in response to information indicative of the second computing node not resuming maintenance of the replica of the collection of data.

19. The non-transitory computer-readable storage medium of claim 15, comprising further instructions that, upon execution by the computing device, cause the computing device at least to:
delete a transaction of the first plurality of transactions from the storage device in response to receiving information indicative of the transaction having been applied to the collection of data.

20. The non-transitory computer-readable storage medium of claim 15, wherein the first computing node acts as a master in a replication group.

* * * * *